Oct. 18, 1966   NOBUYASU YOKOI   3,279,174
CYLINDRICAL WATER TURBINE
Filed March 11, 1964

INVENTOR
nobuyasu yokoi

By: Paul M. Craig, Jr.

ATTORNEY

United States Patent Office 3,279,174
Patented Oct. 18, 1966

3,279,174
CYLINDRICAL WATER TURBINE
Nobuyasu Yokoi, Hitachi-shi, Japan, assignor to Hitachi, Ltd., Chiyoda-ku, Tokyo, Japan, a corporation of Japan
Filed Mar. 11, 1964, Ser. No. 351,139
3 Claims. (Cl. 60—55)

This invention relates to a cylindrical water turbine used in an apparatus in which a generator is connected to a water turbine shaft directly or indirectly through a speed increasing gear and a water current passes a space between an outer casing and an inner casing containing the generator to flow into the runner of the water turbine.

Reference will be made to the accompanying drawings.

FIG. 2 showing the construction of conventional one and FIG. 4 showing the construction of the present invention;

Figure 1:
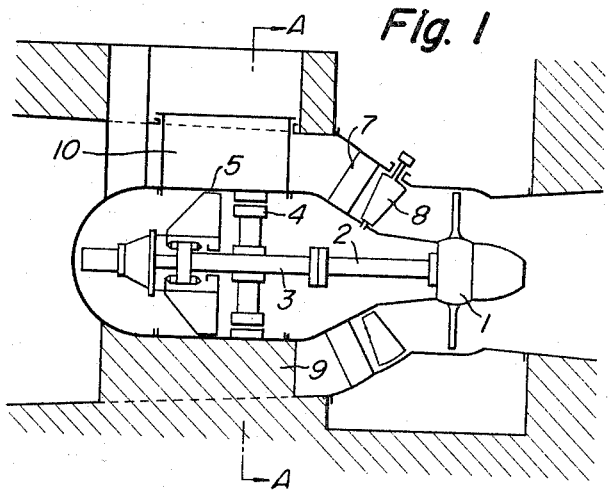
FIG. 1 is a longitudinal sectional view of a cylindrical water turbine in connection with this invention.
Figure 2:
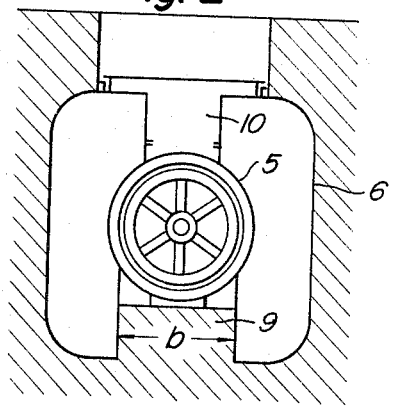
FIGS. 2 and 4 are longitudinal sectional views of the same taken along the line A—A.
Figure 3:
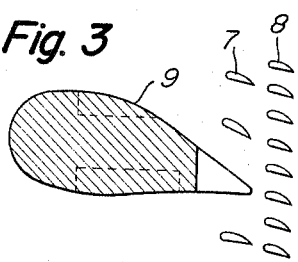
FIG. 3 shows the arrangement of the supporter, guide vanes and stay vanes in FIG. 2.
Figure 4:
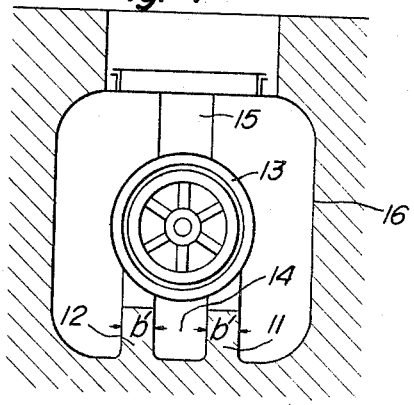

With cylindrical water turbines of this type it is a matter of great importance how to firmly and safely support the inner casing containing the generator within the water current. Recently a variety of devices have been proposed to solve the problem. FIG. 2 shows one of the proposed devices. In this type the inner casing is supported by two supporters, namely upper and lower supporter; the latter 9 is set up just below the central portion of an inner casing 5. As known from FIGS. 2 and 3 showing the sections of the supporter, it is large in width. Therefore, the sectional shape of the supporter is necessary to be made particular in order to make the water current as uniform as possible in the exit portions of the guide vanes. Even if such a method is taken, however, it is impossible to completely remove the influence of the supporter on the water current. Therefore just after the water has got in the blades of the turbine runner, there is brought about turbulence in the flow, which causes vibration of the water turbine and reduction of efficiency. That is a great fault with water turbines of that type.

This invention has been made with a view to getting rid of the fault.

Numeral 1 shows a water turbine runner connected directly to a generator rotor 4 through a water turbine shaft 2 and a generator shaft 3. Numeral 5 represents an inner casing containing said water turbine shaft and generator; 6 an outer casing spaced from said inner casing 5 by a water passage; 7 stay vanes and 8 guide vanes to control the volume of water flowing into the water turbine runner 1. Numerals 9 and 10 indicate above stated lower supporter and upper supporter. Numerals 11 and 12 indicate supporters which are comparatively narrow in width and located in parallel below an inner casing 13. A water passage 14 is formed between the supporters 11 and 12. Numeral 15 shows an upper supporter and 16 an outer casing which as shown is integral with the supporters 11 and 12 and is composed of the same material, as for example, concrete.

Figure 5:
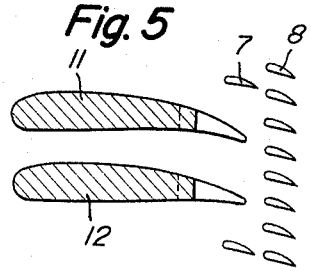
FIG. 5 shows the arrangement of the supporters, guide vanes and stay vanes in FIG. 4.

As stated in the foregoing explanation, in the water turbine of the present invention the inner casing 13 is supported by the two supporters 11 and 12 with a comparatively narrow width $b'$ which form a water passage 14 therebetween just below the inner casing 13. The supporters, stay vanes and guide vanes are arranged in such a relation as shown in FIG. 5. That construction enables obtainment of a uniform water current against the runner without making the supporter in an undesirable shape. Further, as clearly seen from the hydrodynamical point of view, the lower supporters are capable of supporting the water turbine casing stably free from any vibration and the water turbine can work with high efficiency, because the lower supporters have only little hydraulic friction.

What is claimed is:

1. A water turbine generator plant comprising a horizontal generator, a generally cylindrical casing for housing the generator, a runner associated with the generator and rotatably mounted at the end of the casing, an outer casing surrounding the first named casing and defining therewith a space around the first named casing, said space forming a water passage to conduct water to the runner parallelly with the axis of the runner and the first named casing and defining a further space therebetween which acterized in that the supporter is in the form of two substantially identical parallel supporting legs of varying narrow width arranged underneath the first named casing and defining a further space therebetween which constitutes a further water passage lengthwise of the axis of the first named casing, the minimum width of said space and the maximum width of each of said legs being approximately equal, thus comprising means facilitating a uniform flow of water through said spaces against said runner.

2. A water turbine generator plant according to claim 1, wherein said supporting legs and said outer casing are integral with each other.

3. A water turbine generator plant according to claim 1, wherein said supporting legs and said outer casing are composed of the same material.

References Cited by the Examiner

UNITED STATES PATENTS

| 1,494,008 | 5/1924 | Nagler. |
| 2,603,945 | 7/1952 | Brown _____ 60—35.6 |

FOREIGN PATENTS

| 990,190 | 9/1951 | France. |

JULIUS E. WEST, *Primary Examiner.*